(12) United States Patent
Miller et al.

(10) Patent No.: US 6,207,245 B1
(45) Date of Patent: Mar. 27, 2001

(54) FIBERGLASS INSULATION BLANKET WITH RELEASE LINER ASSEMBLY AND METHOD

(75) Inventors: T. Scott Miller, Henderson; Jeffrey L. DeMoss, Corydon, both of KY (US)

(73) Assignee: Scott Industries, Inc., Henderson, KY (US)

( * ) Notice: Subject to any disclaimer, the term of this patent is extended or adjusted under 35 U.S.C. 154(b) by 0 days.

(21) Appl. No.: 09/177,347

(22) Filed: Oct. 23, 1998

(51) Int. Cl.[7] .............................. B32B 5/16; B32B 31/08; C09J 5/06

(52) U.S. Cl. ..................... 428/41.8; 156/62.6; 156/247; 156/307.1; 156/307.3; 156/309.9; 442/394; 442/412

(58) Field of Search .................... 156/62.2, 247; 156/307.1, 307.3, 309.9; 442/394, 412; 428/41.7, 41.8

(56) References Cited

U.S. PATENT DOCUMENTS

| 4,128,954 | 12/1978 | White | 40/310 |
|---|---|---|---|
| 4,188,427 | 2/1980 | Grass | 428/41 |
| 4,606,957 | * 8/1986 | Cohen . | |
| 4,835,037 | 5/1989 | Beer | 428/35.2 |
| 4,849,267 | 7/1989 | Ward et al. | 428/41 |
| 4,995,641 | 2/1991 | Landry et al. | 483/67 |
| 5,102,728 | 4/1992 | Gay et al. | 428/268 |
| 5,246,514 | * 9/1993 | Alderman . | |
| 5,554,238 | * 9/1996 | English . | |
| 5,624,726 | * 4/1997 | Sanocki . | |
| 5,868,891 | * 2/1999 | Weir . | |
| 5,916,393 | * 6/1999 | Shaffer . | |
| 5,916,654 | * 6/1999 | Phillips . | |

* cited by examiner

Primary Examiner—Blaine Copnenheaver
(74) Attorney, Agent, or Firm—Maurice L. Miller, Jr.

(57) ABSTRACT

A batt of acoustical/thermal insulation for use in insulating appliances, compressors, machines and the like is disclosed. The batt comprises a fiberglass blanket and a release liner assembly. The liner assembly features a carrier sheet for supporting layers or coatings of adhesive on opposite broad surfaces thereof. One adhesive coated surface of the carrier sheet is releasably adhesively attached to a conventional release liner which is coated with an adhesive release agent. The other adhesively coated surface is joined to exposed fibers of a surface portion of the fiberglass blanket while the adhesive coating is in a heated, uncured, liquid state so as to immerse surface fibbers of the blanket in the adhesive. The carrier sheet adds stability to the resulting laminate structure and prevents surface fibers from being torn from the blanket when the release liner is removed from the carrier at the time of placement of the batt in service. A method for forming the batt is also disclosed.

6 Claims, 3 Drawing Sheets

FIBERGLASS INSULATION BLANKET WITH RELEASE LINER ASSEMBLY AND METHOD

BACKGROUND OF THE INVENTION

This invention relates generally to a fiberglass blanket having an adhesively attached release liner assembly and method for making the same. An important aspect of this invention is the replacement of a carrier sheet in the release liner assembly for carrying adhesive coatings on opposite surfaces thereof for joinder with a release liner and with surface fibers of the fiberglass blanket. Another important aspect of this invention is the application to either the surface fibers of the fiberglass blanket or to a surface of the carrier sheet of an adhesive coating in an uncured liquid state and the subsequent joinder of the blanket to the carrier sheet while the adhesive coating is in the liquid state such that surface fibers of the blanket are thoroughly coated with the adhesive.

It has long been known in the prior art to adhesively join a fiberglass insulation blanket directly to a sheet of silicone coated release paper. A difficulty encountered with this prior art process and the resulting prior art product is that when the release liner is peeled away from the surface of the blanket at the time it is being placed in service as a thermal or acoustical insulator, surface fibers are often torn away from the blanket as well. Another difficulty encountered has to do with adhesively joining the blanket to the release liner when the adhesive is in a semi-liquidous, plastic-like state because the adhesive does not thoroughly coat surface fibers of the blanket, whereby the tensil strength or "peel" strength of the resulting assembly can be less than a desirable or even suitable level.

By means of our invention, these and other disadvantages encountered using prior art fiberglass blankets with adhesively joined release liners are substantially overcome.

SUMMARY OF THE INVENTION

It is an object of our invention to provide a novel batt of acoustical/thermal insulation including a fiberglass blanket and an adhesively joined release liner assembly.

It is a further object of our invention to provide a novel method for making a batt of insulation.

It is yet another object of our invention to provide a batt of insulation including a fiberglass blanket and a release liner assembly wherein the assembly includes a carrier sheet for supporting a layer of adhesive used to join the blanket to the assembly.

It is also an object of our invention to provide a batt of insulation including a fiberlass blanket and a release liner assembly wherein the former is adhesively joined to the latter by an adhesive coating while the coating is in a heated, uncured liquid state.

Briefly, in accordance with our invention there is provided an improved acoustical and thermal insulation laminate of the type which conventionally includes a fiberglass blanket and a release liner sheet. The improvement comprises a carrier sheet for carrying adhesive coatings on opposite broad surfaces thereof. A first of the coatings is sandwiched between the carrier sheet and the fiberglass blanket and a second of the coatings is sandwiched between the carrier sheet and the release liner sheet.

An additional feature of our invention is application of at least one of the adhesive coatings to either the carrier sheet or the fiberglass blanket while in a heated, uncured liquid state followed by adhesively joining the carrier sheet to the fiberglass blanket while the adhesive coating therebetween is still in a liquid state such that surface fibers of the blanket can be thoroughly coated with the adhesive.

These and other objects, features and advantages of the present invention will become apparent to those skilled in the art from the following detailed description and attached drawings upon which, by way of example, only certain preferred and other important embodiments of our invention are described and illustrated.

DESCRIPTION OF THE PREFERRED EMBODIMENT

Figure 1:
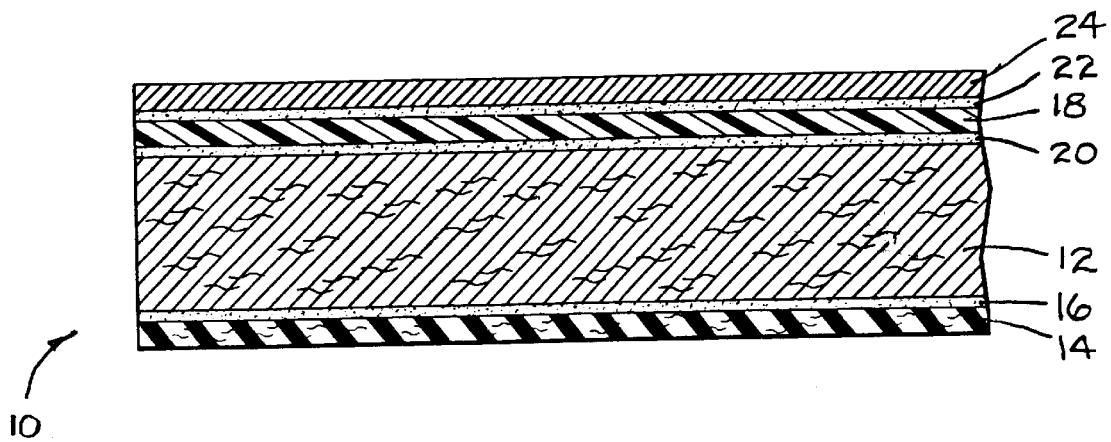
FIG. 1 shows a cross-sectional edge view of a fiberglass blanket having a release liner assembly adhesively attached thereto, thus illustrating a preferred embodiment of our invention.

Referring now to the drawing figures and, specifically, to FIG. 1, there is shown, in a preferred embodiment of our invention, a batt of thermal and/or acoustical insulation, generally designated 10. The batt 10 includes a fiberglass blanket 12 having a conventional backing 14 such as may be formed of fiberglass, aluminum foil scrim kraft (also known as FSK) or other suitable and well known materials customarily used to cover a broad surface of a fiberglass blanket to protect what would otherwise be an exposed surface of the blanket during handling. The backing 14 is joined to a first broad surface of the fiberglass blanket 12 by a suitable layer 16 of adhesive in a conventional and well known manner.

Figure 2:
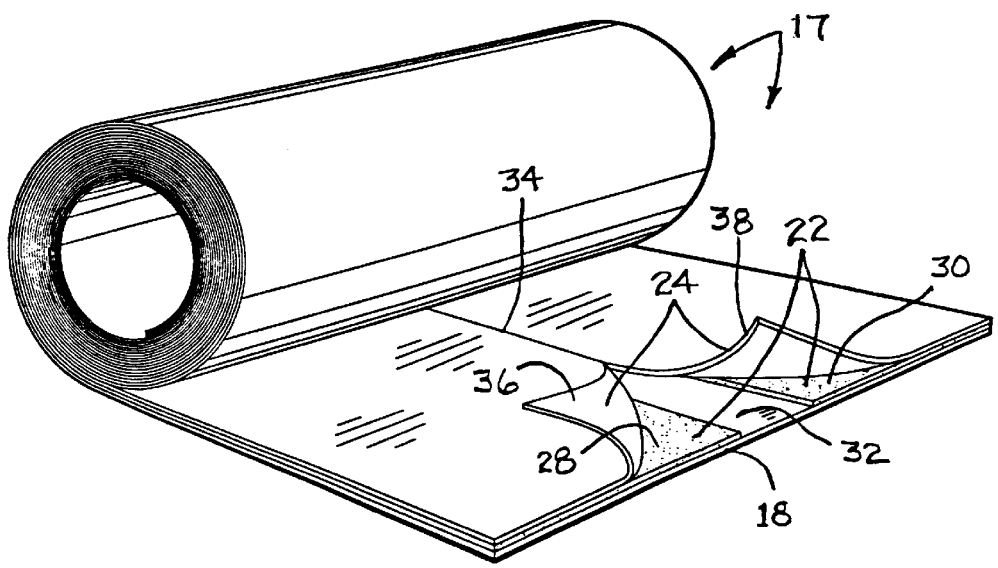
FIG. 2 shows a perspective view of a release liner assembly partially rolled for transportation and/or storage.

Now, in accordance with our invention, and with additional reference to FIG. 2, a release liner assembly 17 (See FIG. 2) is formed for joinder to a second broad surface of the fiberglass blanket 12 which includes a carrier sheet 18 for carrying pressure sensitive adhesive layers 20 and 22 on opposite broad surfaces thereof and a release liner sheet 24. The carrier sheet 18 should be flexible and may be constructed of suitable plastic such as that sold by the DuPont Company under the trademark MYLAR. It may also be in the form of a woven fabric or textile, FSK, or even paper, provided the paper is sufficiently thick and durable so as not to tear when the release liner sheet 24 is removed from the adhesive containing carrier sheet 18, as later more fully explained. The release liner 24 is conventional and may be formed of paper or a suitable paper-like plastic which contains a suitable adhesive release agent on the broad surface of the liner 24 which engages the adhesive layer 22. The release agent is preferably silicone, although other suitable materials such as Teflon could be used, provided cost is not a major consideration.

The release liner assembly 17 is shown in FIG. 2 prior to being applied to the fiberglass blanket 12, 14 of FIG. 1 to form the batt 10 of the latter mentioned figure. The release liner assembly 17 is typically far less bulky than the fiberglass blanket 12, 14 and can be gathered tightly into a relatively dense roll as shown in FIG. 2 for convenient storage and/or transportation prior to being added to the more bulky fiberglass blanket. Note in FIG. 2 the carrier 18, the adhesive layer 22 and the release liner 24. In this example, the adhesive layer 22 is applied in two spaced apart strips 28 and 30 to form a central gap 32 in the adhesive layer which extends longitudinally of the assembly 17. The liner 24 is slit longitudinally along a slit line 34 which extends over and along the approximate center of the gap 32 to form two liner strips 36 and 38. Inner edge portions of the liner strips 36 and 38 thus extend over the gap 32 to meet along the slit line 34. As a result, the liner strips 36 and 38 can readily be gripped by hand over the gap 32 and peeled off of the adhesive strips 28 and 30 outwardly away from the slit line 34 when that action becomes necessary to expose the adhesive layer 22 following assembly of the batt 10 and at the time it is being placed in service.

Figure 3:
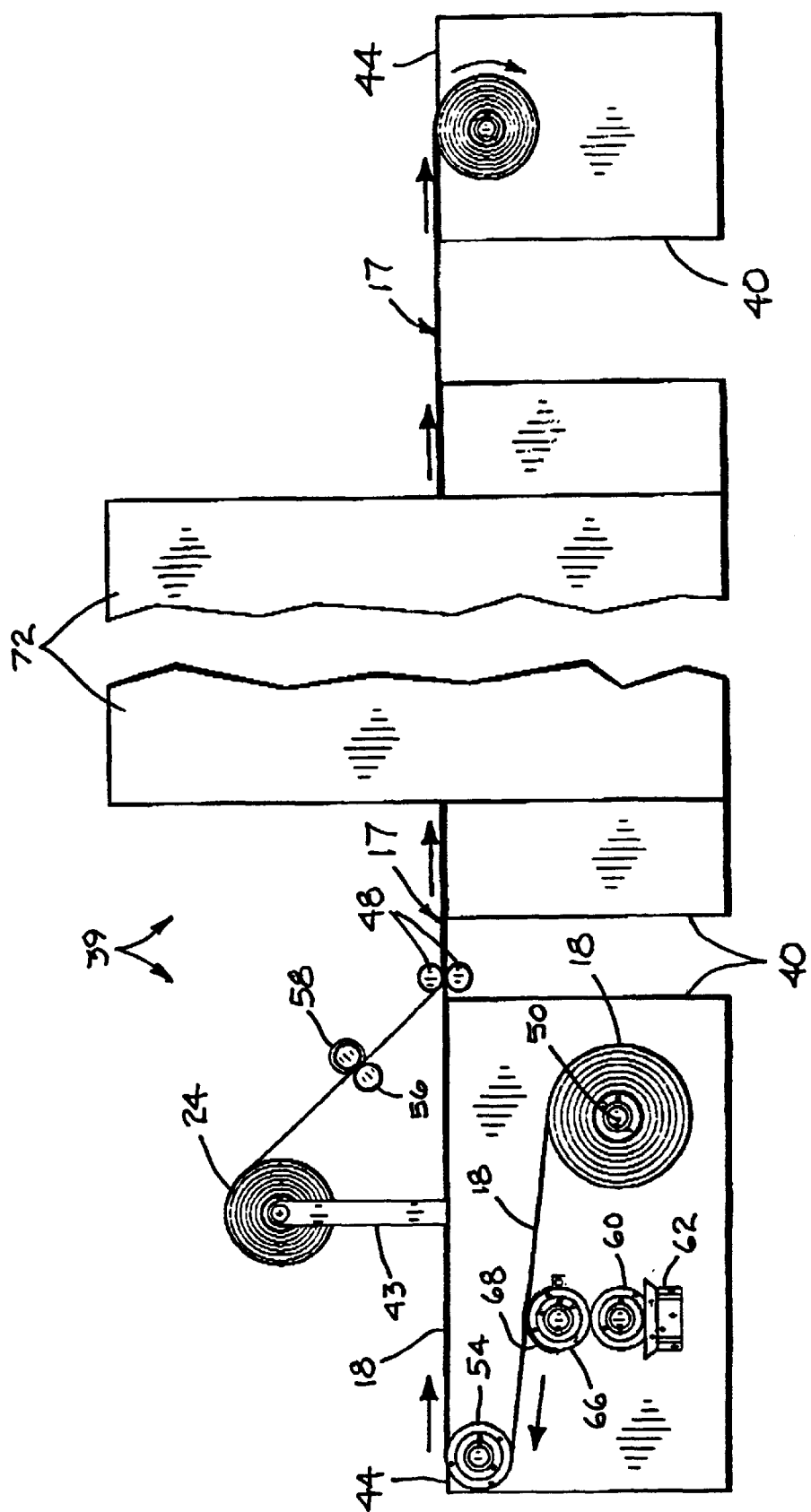
FIG. 3 shows schematically, a system for assembling the release liner assembly of FIG. 2.

Referring now in addition to FIG. 3 there is shown, schematically, a mechanical assembly line, generally designated 39 for forming the release liner assembly 17 of FIG. 2. Thereafter, the same or a different and generally similar assembly line can be used to join the completed assembly 17 to the fiberglass blanket 12, 14 of FIG. 1 to form the batt 10 of the latter mentioned figure. In forming the release liner assembly 17, a frame 40 is provided containing a roller 42 mounted on standards 43 over a table 44. A roll of the release liner 24 is mounted on the roller 42 so that the liner can be unrolled downwardly from left to right as viewed, through a slitter assembly containing a hardened steel roller 56 upon which rolls a conventional cutting roller 58 and, thence, through a pair of guide rollers 48 and, thereafter, along the table 44. A roller 50 located under the table 44, contains a roll of the carrier 18. The carrier 18 is unrolled from right to left as viewed toward and around an end roller 54, thence from left to right as viewed along the top of the table 44 and through the rollers 48 under the release liner 24.

Figure 5:
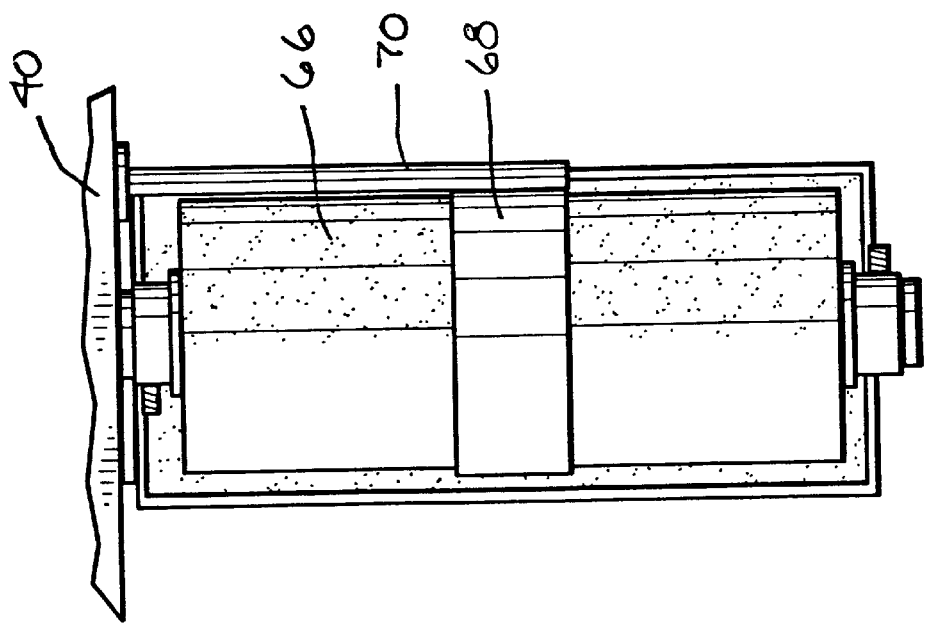
FIG. 5 shows a top plan view of the work station of FIG. 4 with the overlying carrier sheet of the release liner assembly being removed.
Figure 4:
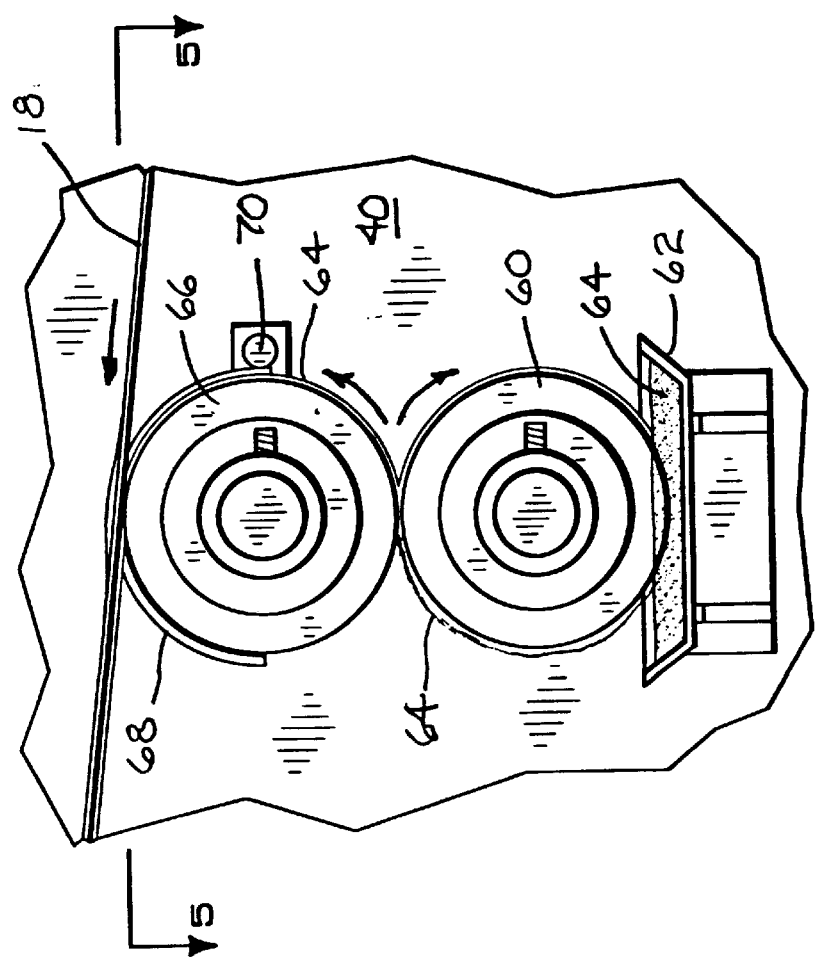
FIG. 4 shows an enlarged side elevation view of a fragment of the assembly system of FIG. 3, illustrating a work station for applying a liquid adhesive coating onto a surface of an adhesive carrier sheet.

Referring now also to FIGS. 4–5 and located between the roller 50 and the roller 54 of FIG. 3 is positioned a work station for applying an uncured adhesive in a liquid state to a broad surface of the carrier 18 which will ultimately be adhesively joined to an opposing broad surface of the slit release liner 24 by the rollers 48. The subject work station includes a first roller 60 mounted over a vat 62 containing an uncured adhesive 64 in a liquid state so that, as the roller 60 turns, a lower portion thereof travels through the uncured liquid adhesive 64 in the vat. (See particularly FIG. 4). As the roller 60 continues to turn with liquid adhesive applied thereto, it encounters a second roller 66 mounted above it which rotates in the opposite direction such that the second roller picks up liquid adhesive from the first roller and wipes it onto the underside of the carrier 18 traveling over it toward the roller 54. A semicircular metal bracket 68 overlies a central portion of the roller 66 to prevent adhesive from being applied to a longitudinally extending central strip of the carrier 18, thereby forming the gap 32 between the two side strips 28 and 30 of the adhesive as shown in FIG. 2. The bracket 68 is welded to a support arm 70 extending from the far side of the frame 40. Accordingly, as the carrier 18 rounds the end roller 54 it contains the liquidous adhesive on the broad surface thereof to be joined to the liner 24 by the rollers 48.

After joinder of the carrier 18 to the liquid adhesive containing surface of the release liner 24 to form the release liner assembly 17, the latter is pulled through an oven 72 to cure the adhesive layer 22 as shown in FIG. 2. The adhesive layer 22 can range in thickness from about ½ mil up to about 8 to 10 mils. Typically, an adhesive layer thickness of about 4 mils will be satisfactory for most applications. The oven 72 should be heated to a temperature of between about 200 to 300 degrees F. and the release liner assembly 17 should be run at a speed through the oven which will take any portion thereof from about 2 to 5 minutes to pass through. The minimum time of passage of the assembly 17 through the oven 72 necessary to cure the adhesive will depend, in large measure, on the thickness of the adhesive layer 22. After passage through the oven 72, the liner assembly 17 containing the now cured adhesive layer 22 is rolled tightly about a driven roller 74. In the alternative, the adhesive layer 22 of the assembly 17 could be air cured for about 24 to 96 hours after the assembly is formed into a roll, depending upon thickness of the layer and ambient temperature and humidity conditions, in which event the oven 72 would either be by-passed by the assembly 17 or, otherwise turned off.

Once the assembly 17 has been formed it can be run on a similar assembly line to add the adhesive layer 20 in a liquid state to the opposite surface of the carrier 18 and then be joined to the fiberglass blanket 12, 14 to form the batt 10 as shown in FIG. 1. The joinder of the fiberglass blanket 12, 14 to the adhesive layer 20 of the carrier 18 while the adhesive is in a liquid state is important because this permits glass fibers at the surface of the blanket being joined with the carrier 18 to be relatively deeply immersed in and, thus, be more fully coated with adhesive than would otherwise be the case where the layer 20 is in a more a plastic or semi-liquidous state at the time of joinder with the blanket. Types of adhesive that are suitable for the layer 20 and which may also be used for the layer 22 include hot melt adhesives having a rubber, acrylic, water or solvent base. Such hot melt adhesives must typically be heated and applied at a temperature above about 120 degrees F., which is the temperature at and below which the adhesive becomes tacky. We recommend heating such an adhesive to about 140 degrees F. to be assured that it will remain liquidous on the surface of the carrier 18 until joined to the fiberglass 12 in an assembly line process.

The present example illustrates applying the layer 22 of adhesive to the carrier 18 before joinder of the release liner 24 to the carrier 18. In the alternative, the adhesive layer 22 could be applied directly to a broad surface of the release liner 24 before joinder of that surface to the carrier 18. We prefer applying the liquidous adhesive to the carrier 18 rather than to the liner 24 because the liquid tends to bead on the latter rather than form a smooth coating as it does on the former. Similarly, the adhesive layer 20 can either be applied in a liquid state to the carrier 18 before joinder to the fiberglass blanket 12 or the liquid adhesive layer 20 can be applied directly to the exposed broad surface of the fiberglass blanket 12 before joinder with the opposing broad surface of the carrier 18. The application of side-by-side strips of adhesive such as at 28 and 30 in FIG. 2 to either the release liner 24 or the carrier 18 before joinder of one with the other so as to form a longitudinally extending gap 32 between the strips over which inner edges of the release liner 24 overlap and abutt along the central slit 34 is optional. It provides convenience in handling of the batt 10 during installation for purposes of thermal and/or acoustical insulation in removing the release liner 24 for attachment of the tacky adhesive layer 22 to an appliance on machine to be shielded by the batt. The use of the carrier 18 for supporting the adhesive layers 20 and 22 and the application of the adhesive layer 20 in a liquid state to immerse surface fibers of the fiberglass blanket 12 therein constitute critical features of this invention.

To complete the description of the preferred embodiment of our invention we recommend the following: Release liner 18 by International Paper, Akrosil Division, 206 Garfield Avenue, product designation, SBL 42 SC SILOX G1H/0 or SBL 3.2 SC SILOX G21/0 or by Griff and Associates, 7900 N. Radcliffe Street, Bldg. 106, Bristol, Pa. 19007, product designation, 4003 Release Paper; Pressure Sensitive Adhesive for layer 20 and, if desired, layer 22 by Air Products and Chemicals, Inc., 7201 Hamilton Blvd., Allentown, Pa. 18195-1501, product designation, Flexcryl LC.18 or 560H or by H. B. Fuller Company, Corporate R&D Facility, 3450 LaBore Road, Vadnais Heights, Minn. 55110, product designation, WB-3236 Y EN, WB-3236 Y B or WB-0912; Carrier 18 by Transilwrap Company, Inc., 2820 N. Paulina Street, Suite 100, Chicago, Ill. 60657, product designation, ½ mil clear polyester film or ½ mil clear DuPont film or by Douglas Hanson Company, Inc., P.O. Box 207, Hammond, Wis. 54015, product designation, 0.0005" PET film; Fiberglass Insulation 12 by John Manville, P.O. Box 5108, Denver, Colo. 80217-5108, product designation, Microlite, Tufskin, EOM, or SG-30 or by Owens Corning, Fiberglass Tower, T/22, Toledo, Ohio 43659, product designation, Thermomat, HV-24 or EA-30.

The use of a carrier such as shown at 18 to carry pressure sensitive adhesive thereon to join the fiberglass blanket 12, such as shown at 20, adds significant tensile strength to the adhesive layer over that which would be present without the carrier and is believed to be novel when used with fiberglass. Also use of the carrier 18 for supporting the adhesive layer 20 aids in preventing glass fibers from being torn from the blanket 12 upon removal of the release liner 24 as where the release liner is adhesively adhered directly to the fiberglass blanket in accordance with prior art techniques.

In an alternative embodiment of our invention, a release liner assembly is formed for application to a fiberglass blanket in the following manner. A roll or sheet of release liner is provided which contains a conventional adhesive release agent such as a silicone film on both broad surfaces thereof. A roll or sheet of carrier for supporting an adhesive layer on both broad surfaces thereof is also provided. Next, a first coating of a curable adhesive is applied to either a first broad surface of the carrier or to a first broad surface of the release liner, after which the carrier and release liner are adhesively joined. A second coating of a curable adhesive is heated and applied in a liquid state to a second broad surface of the carrier. The adhesive coatings are cured and the resulting relatively thin release liner assembly is gathered into a roll wherein the second coating of adhesive on the second surface of the carrier is applied against an exposed, release agent containing broad surface of the release liner.

Thereafter, the relatively thin release liner assembly can be stored and/or shipped to a remote location for assembly with a relatively bulky fiberglass blanket near a point of sale. At the remote location the roll of release liner assembly can be unrolled to expose the second adhesive layer on the carrier and the second layer, along with the first layer, can be reheated to reliquify the second layer for joining a roll or sheet of fiberglass to the exposed and reliquified layer of adhesive on the carrier to form a bat or insulation. Thereafter, the adhesive layers of the batt can be either recured either by air or in an oven. In this manner, substantial transportion costs can be saved by forming the relatively thin release liner assembly at one location for shipment to another location for later joinder with the relatively bulky fiberglass blanket at the latter location which would presumably be closer to the point of sale and/or use than the original location where the release liner assembly was made.

In the alternative, the release liner assembly can be rolled and shipped to a remote location without the second adhesive layer having been applied. In such a case, the release liner need not contain an adhesive release agent on its exposed surface and the second adhesive layer can be applied in a heated liquid state at the remote location to either the exposed surface of the fiberglass blanket or to the second broad surface of the carrier immediately prior to joining the blanket with the carrier of the release liner assembly.

Although the present invention has been described with respect to specific details of certain preferred and other important embodiments thereof, it is not intended that such details limit the scope and coverage of this patent other than as specifically set forth in the following claims.

We claim:

1. A method for forming a release liner assembly on a fiberglass blanket, the steps of which comprise
   (A) providing a release liner containing an adhesive release agent on a first broad surface thereof;
   (B) providing a carrier sheet for supporting an adhesive;
   (C) applying a first layer of a curable adhesive in an uncured state to either a first broad surface of said carrier sheet or to the release agent containing first broad surface of the release liner;
   (D) applying the release agent containing surface of said release liner to said first broad surface of said carrier sheet following step (C) while said first layer of adhesive is in an uncured state;
   (E) applying a second layer of a curable adhesive in an uncured liquid state to either a second broad surface of said carrier sheet or to an exposed surface of a fiberglass insulation blanket; and
   (F) applying said fiberglass blanket to said second broad surface of said carrier sheet following step (E) while said second layer of adhesive is in an uncured liquid state.

2. The method of claim 1, the steps of which further comprise
   (G) curing said first layer of adhesive following execution steps (A) through (D) and prior to execution of steps (E) through (F); and
   (H) curing said second layer of adhesive following execution of steps (A) through (F).

3. A method for forming a release liner assembly on a fiberglass blanket, the steps of which comprise
   (A) providing a release liner containing an adhesive release agent on opposing broad surfaces thereof;
   (B) providing a carrier sheet for supporting an adhesive thereon;
   (C) applying a first layer of a curable adhesive in an uncured state to either a first broad surface of said carrier sheet or to one of the release agent containing broad surfaces of said release liner;
   (D) applying a first release agent containing broad surface of said release liner to said first adhesive layer containing broad surface of said carrier sheet while said first adhesive layer is in an uncured state;
   (E) providing a fiberglass insulation blanket;
   (F) applying a second layer of a curable adhesive in an uncured liquid state to a second broad surface of said carrier sheet to form a release liner assembly;
   (G) curing said first and second layers of adhesive;
   (H) forming said assembly into a roll wherein said second adhesive layer containing second broad surface of said carrier sheet is rolled in contact against an exposed release agent containing broad surface of said release liner for storage and/or transport;

(I) heating said assembly following storage and/or transport to reliquify said second adhesive layer;

(J) unrolling said rolled assembly;

(K) applying a blanket of fiberglass to said reliquified second adhesive layer containing second broad surface of said carrier sheet while said second adhesive layer remains in a liquid state; and (L) recuring said second adhesive layer.

4. An improved acoustical and thermal insulation laminate comprising a fiberglass insulation blanket, a release liner sheet and a carrier sheet carrying adhesive coatings on opposite broad surfaces thereof, a first of said coatings being sandwiched between and contacting said carrier sheet and surface fibers of said fiberglass insulation blanket and a second of said coatings being sandwiched between and contacting said carrier sheet and said release liner.

5. The laminate of claim 4 wherein said carrier sheet is selected from the group consisting of plastic, paper, woven fabric and foil scrim kraft.

6. A batt of fiberglass insulation comprising a release liner, a carrier sheet and a fiberglass insulation blanket, said release liner being releasable adhesively joined to a first broad surface of said carrier, a second broad surface of said carrier sheet being joined to said fiberglass blanket by a process, the steps of which comprise heating a batch of adhesive to render the adhesive in a liquid state, applying a layer of the adhesive in a liquid state following the step of heating to either said second broad surface of said carrier sheet or to a surface of said fiberglass blanket, joining said blanket to said carrier sheet following the step of applying while said adhesive layer is in a liquid state, and curing said layer following the step of joining.

* * * * *